(12) United States Patent
Azai

(10) Patent No.: US 6,431,484 B2
(45) Date of Patent: Aug. 13, 2002

(54) FRICTION TYPE OF POWER TRANSMISSION MECHANISM FOR DRIVING REEL SUPPORT IN VTR

(75) Inventor: Koji Azai, Takefu (JP)

(73) Assignee: Orion Electric Co., Ltd., Fukui (JP)

( * ) Notice: Subject to any disclaimer, the term of this patent is extended or adjusted under 35 U.S.C. 154(b) by 0 days.

(21) Appl. No.: 09/814,968

(22) Filed: Mar. 23, 2001

(30) Foreign Application Priority Data

Mar. 24, 2000 (JP) ........................................ 2000-084446

(51) Int. Cl.[7] ............................................... G11B 15/32
(52) U.S. Cl. ................................. 242/356.5; 242/356.7
(58) Field of Search ........................... 242/356.5, 356.7

(56) References Cited

U.S. PATENT DOCUMENTS

| | | | | |
|---|---|---|---|---|
| 3,529,787 A | * | 9/1970 | Bowman et al. | |
| 3,938,756 A | * | 2/1976 | Katoh | 192/12 B |
| 4,044,868 A | * | 8/1977 | Berger | 192/12 B |
| 5,641,130 A | * | 6/1997 | Weisser | 242/356.3 |
| 5,735,476 A | * | 4/1998 | Kim et al. | 242/356.3 |
| 5,884,858 A | * | 3/1999 | Woo | 242/356.5 |
| 6,145,769 A | * | 11/2000 | Shiraishi et al. | 242/340 |

* cited by examiner

Primary Examiner—Donald P. Walsh
Assistant Examiner—Jonathan R. Miller
(74) Attorney, Agent, or Firm—Wenderoth, Lind & Ponack, L.L.P.

(57) ABSTRACT

Disclosed is an improved friction type of power transmission mechanism for driving a reel support in a VTR wherein the power is transmitted from the motor to the reel support via the follower pulley, which is sandwiched and clamped between a base disk and an annular plate. The follower pulley has a first friction ring sandwiched between the base disk and the lower flange surface of the follower pulley and a second friction ring sandwiched between the annular plate and the upper flange surface of the follower pulley. With this arrangement an increased torque can be produced without causing excessive abrasion. The diameter of the circular opening of one of the first and second friction rings is equal to or larger than the outer diameter of the other friction ring. This has the effect of saving the material of friction ring.

6 Claims, 5 Drawing Sheets

FRICTION TYPE OF POWER TRANSMISSION MECHANISM FOR DRIVING REEL SUPPORT IN VTR

BACKGROUND OF THE INVENTION

1. Field of the Invention

The present invention relates to a friction type of power transmission mechanism for driving a reel support in a videotape recorder (hereinafter abbreviated as VTR). In the VTR the tape-driving power is transmitted from the capstan motor to the reel support via the follower pulley, which is sandwiched and clamped between a base disk and an annular plate.

2. Related Arts

FIG. 5 illustrates the VTR as viewed from the bottom. As seen from the drawing, it uses a power transmission mechanism, in which the driving power is transmitted from the capstan motor 59 to either reel support via the clutch rotary mechanism, the friction type of power transmission mechanism 50, the swing idler mechanism and a gang of gears and the reel gears associated with the reel support. The capstan motor 59 has a primitive pulley 60 fixed to its shaft, and the primitive pulley 60 is connected to the follower pulley 51 of the clutch rotary mechanism via the belt 61.

When the VTR is loaded with a magnetic tape by pinching the tape between the capstan and the pinch roller, the VTR can be put in: the play mode in which the reel support is rotated in the tape-winding direction (tape being played back); the reversal mode in which the reel support is rotated in the tape-rewinding direction (tape being rewound); the fast feeding mode in which the reel support is rotated at an increased speed in the tape-winding direction (tape being played back quickly); and the rewinding mode in which the reel support is rotated at an increased speed in the tape-rewinding direction (tape being rewound quickly).

In the play mode and the reversal mode the clutch rotary mechanism is put in the disengagement condition in which the associated gears are disengaged from each other, thereby allowing the rotation of the capstan motor to be transmitted to the swing idler via the friction type of power transmission mechanism 50. In the fast feeding mode and the rewinding mode the clutch rotary mechanism is put in the engagement condition in which the associated gears are engaged together, thereby allowing the rotation of the capstan motor to be transmitted directly to the swing idler.

Both in the play and reversal mode it is necessary that the tape be sandwiched between the capstan and the pinch roller, and that the tape be fed at a constant speed. The reel support which is driven by the capstan motor 59 via the belt, must be rotated at the speed dependent on the instantaneous diameter of the tape wound around the reel support. To meet this requirement the follower pulley 51 is equipped with the friction type of power transmission mechanism 50 (see FIG. 6).

When the power is transmitted from the capstan motor 59 to the follower pulley 51, the follower pulley 51 is rotated. The friction ring 52 permits the follower pulley 51 to slip in rotation, thereby feeding the tape at a constant speed independent from the varying diameter of the tape wound. The friction ring 52 adheres to the base plate 53 so that the flange surface of the follower pulley 51 may be put in friction contact with the base plate 53, thus transmitting the rotary torque from the follower pulley to the base plate 53, and hence to the reel support via the cam 55 and cap 56, which are fastened to the cylinder axle 54 of the base plate 53.

As seen from the drawing, the coiled spring 58 is sandwiched between the cap 56 and the spacer 57, applying a predetermined two-dimensional or surface pressure to the friction ring 52, thereby producing a predetermined amount of friction force. In general, the friction type of power transmission mechanism 50 produces the torque according to the following equation:

$$T = \mu N \, r,$$

where "T" stands for torque; "$\mu$" stands for friction coefficient; "N" stands for two-dimensional or surface pressure; and "r" stands for the mean diameter of the friction ring.

As is apparent from this equation, a desired strength of torque can be obtained by increasing the two-dimensional or surface pressure and/or the mean diameter of the friction ring. The increasing of the resilient strength of the coiled spring 58 and hence the two-dimensional or surface pressure to be applied to the friction ring, however, will cause abrasion both of the friction ring 52 and the follower pulley 51, thus producing unstable torque at an early stage.

Alternatively the increasing of the mean diameter of the friction ring will cause the size of the friction ring 52 and hence the size of the whole mechanism to be increased accordingly. If any significant deformation of the follower pulley 51 and the base plate 53 should result from the lowering of the precision with which the parts are produced, the torque cannot be increased in proportion with the increasing of the mean diameter of the friction ring.

SUMMARY OF THE INVENTION

One object of the present invention is to provide a friction type of power transmission mechanism for driving a reel support in a VTR, which is free of the defects as described above, permitting stable torque transmission and extending its life.

To attain this object a friction type of power transmission mechanism for driving a reel support in a VTR wherein the power is transmitted from the motor to the reel support via the follower pulley, which is sandwiched and clamped between a base disk and an annular plate, is improved according to the present invention in that the follower pulley has a first friction ring sandwiched between the base disk and the lower flange surface of the follower pulley and a second friction ring sandwiched between the annular plate and the upper flange surface of the follower pulley, the diameter of the circular opening of one of said first and second friction rings being equal to or larger than the outer diameter of the other friction ring.

The base disk may have the first friction ring adhering to its upper surface, and the annular plate may have the second friction ring adhering to its lower surface. Otherwise, the follower pulley may have the first and second friction rings adhering to its opposite flange surfaces. These friction rings produce larger and smaller torques, which can be determined by substituting the larger and smaller radiuses for "r" in the equation: $T = \mu N \, r$; the other factors are of same quantities. With this arrangement the increased quantity of resultant friction force is available, and therefore, a good strength of friction force can be obtained even if the two-dimensional pressure is decreased to the extent of preventing the excessive abrasion of the friction rings. Also advantageously, the smaller friction ring has the same diameter as the circle of the larger friction ring, and therefore, the smaller ring can be produced from the circle which is stamped out of the larger circle to leave the larger ring. Thus, the remaining friction material which otherwise would be thrown away can be used to produce the smaller ring, thus requiring no extra material.

The follower pulley may have inner circular and outer annular sections at different levels, thus defining the stepwise transitions from the inner circular to outer annular section on the opposite sides of the pulley. This step-wise flange has the effect of preventing the total thickness of the pulley flange and the friction rings from increasing, and preventing the spreading of lubricating oil from the sliding parts to the friction section under the centrifugal force.

Other objects and advantages of the present invention will be understood from the following description of a friction type of power transmission mechanism for driving a reel support in a VTR according to one preferred embodiment of the present invention, which is shown in accompanying drawings:

DETAILED DESCRIPTION OF PREFERRED EMBODIMENT

Figure 1:
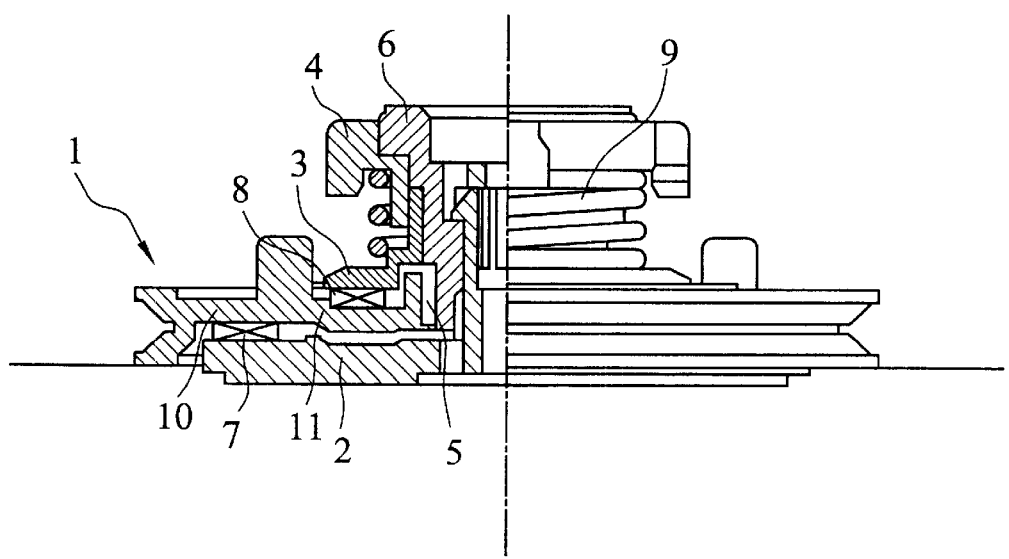
FIG. 1 is a longitudinal section of one part of a friction type of power transmission mechanism according to the present invention.
Figure 2:
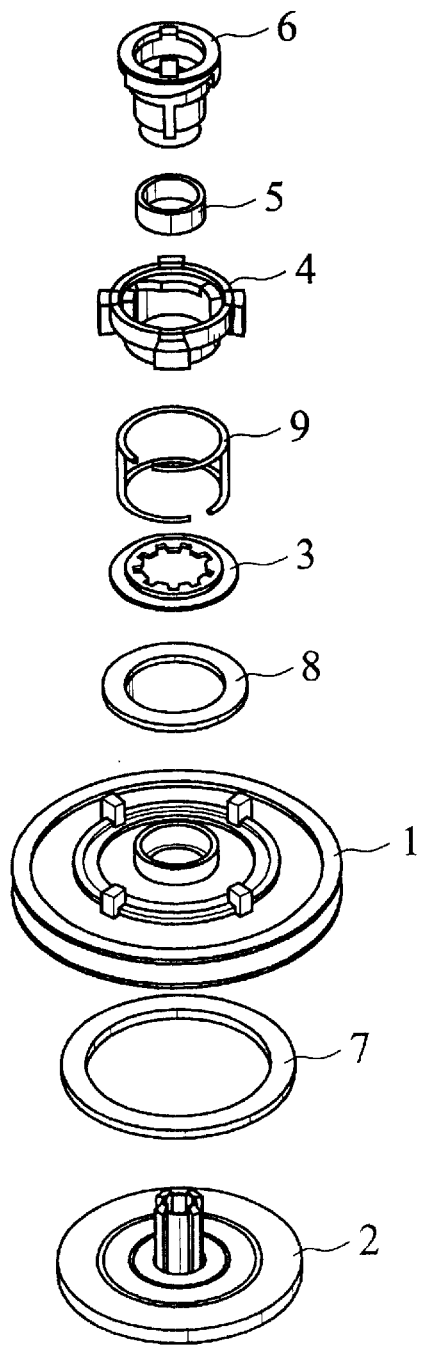
FIG. 2 is an exploded view of the part of the friction type of power transmission mechanism.
Figure 3:
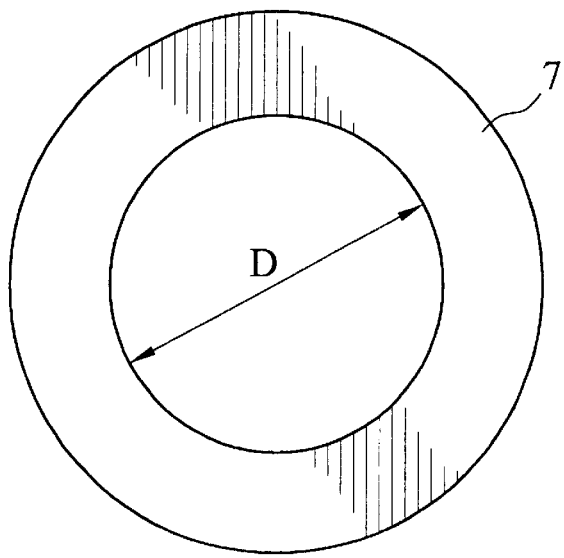
FIG. 3 is a larger friction ring.
Figure 3:
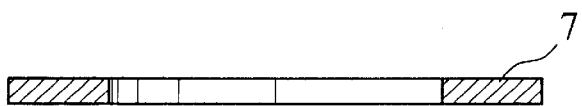

Referring to FIGS. 1 to 4, a friction type of power transmission mechanism for driving a reel support in a VTR includes a follower pulley 1, a base disk 2, an annular plate 3, a cap 4, a sleeve 5, a cam 6, a larger friction ring 7, a smaller friction ring 8 and a coiled spring 9. The driving power is transmitted from the capstan motor 59 (see FIG. 5) to the pulley 1 via the belt 61, thus rotating the cam 5 and the cap 4 via the base disk 2 and the annular plate 3.

The larger friction ring 7 adheres to the circumference of the upper surface of the base disk 2, and likewise, the smaller friction ring 8 adheres to the circumference of the lower surface of the annular plate 3. The coiled spring 9 is sandwiched between the cap 4 and the annular plate 3, thus making the larger and smaller friction rings 7 and 8 to be applied to the lower and upper surfaces of the follower pulley 1 under a predetermined pressure. Application of the larger and smaller friction rings 7 and 8 to the opposite flange surfaces of the follower pulley 1 has the effect of apparently increasing the mean radius "r", thereby producing an increased torque without increasing the two-dimensional pressure.

The manner in which the friction type of power transmission mechanism works in the play mode is described below. While the radius of the tape wound around the reel support on the winding side is small, the follower pulley 1 is allowed to slip somewhat between the friction rings 7 and 8, allowing the base disk 2, the cap 4 and the cam 6 to rotate at a controlled speed appropriate for keeping the tape running at a constant speed. As the radius of the tape wound around the reel support on the winding side increases, the follower pulley 1 is allowed to slip more and more between the friction rings 7 and 8, thereby allowing the base disk 2, the cap 4 and the cam 6 to rotate at another controlled speed appropriate for keeping the tape running at the constant speed. Thus, the tape can be wound in stable condition all the time.

Figure 4:
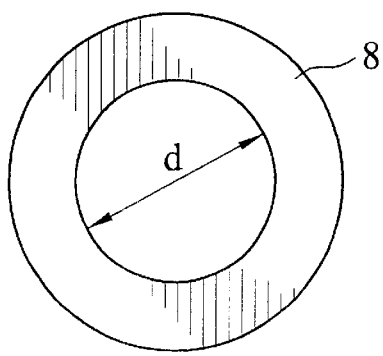
FIG. 4 is a smaller friction ring.
Figure 4:
Figure 5:
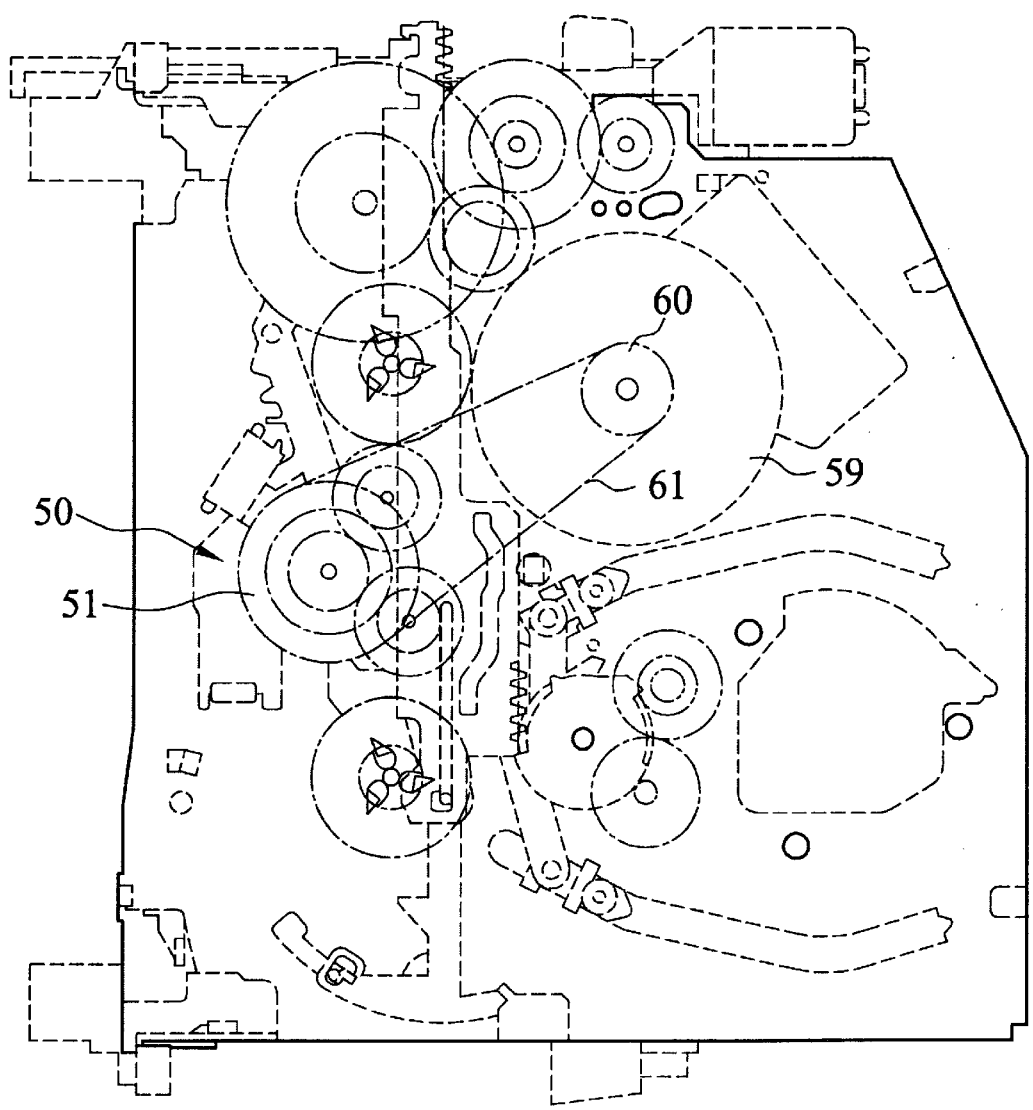
FIG. 5 illustrates how different parts are arranged in the friction type of power transmission mechanism.
Figure 6:
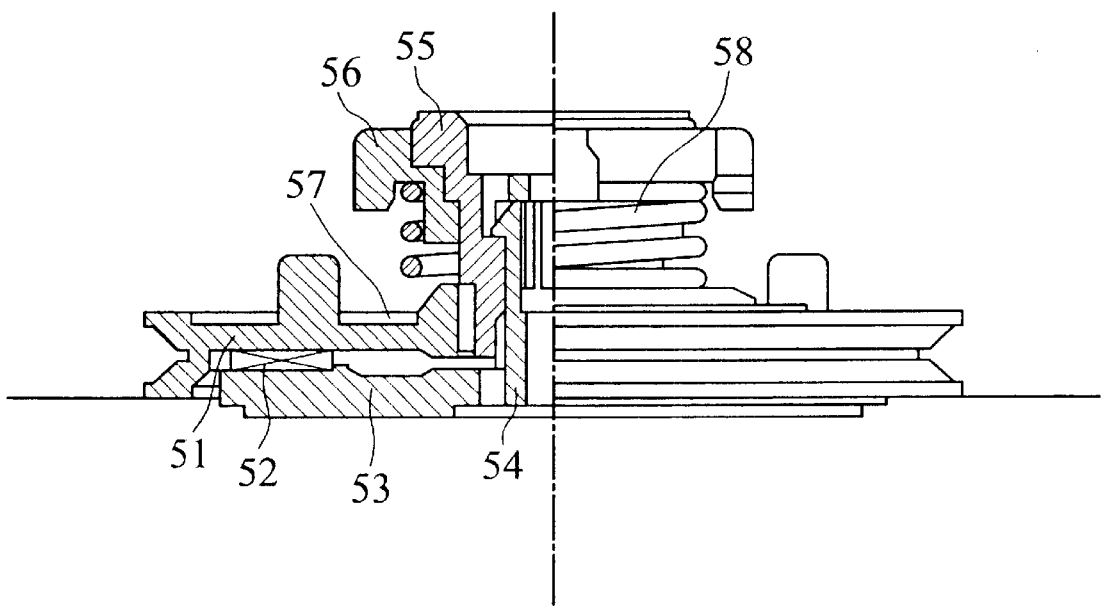
FIG. 6 is a longitudinal section of one part of a conventional friction type of power transmission mechanism.

The diameter "D" of the circular aperture of the larger friction ring 7 (see FIG. 3) is equal to or larger than the diameter "d" of the smaller friction ring 6 (see FIG. 4). These friction rings can be made by stamping out from a piece of felt, although not limitative to this particular material. The smaller friction ring 8 can be made from the circular piece of felt, which is left after stamping the larger friction ring from the piece of felt, and would be thrown away if the friction rings of same size were made. No extra material, therefore, is required in making smaller friction rings.

The larger friction ring 7 adhering to the base disk 2 is put in contact with the lower surface of the follower pulley 1 whereas the smaller friction ring 8 adhering to the annular plate 3 is put in contact with the upper surface of the follower pulley 1. As a matter of fact, the friction ring is preferably applied to the circumference of the annular plate 3. Use of larger and smaller friction rings, however, permit use of the remaining material, which otherwise, would be thrown away.

As seen from FIG. 1, the follower pulley 1 has inner circular and outer annular sections at different levels, thus defining the stepwise transitions from the inner circular to outer annular section on the opposite sides of the follower pulley 1. This step-wise flange has the effect of preventing the total thickness of the pulley flange and the friction rings 7 and 8 from increasing, and preventing the spreading of lubricating oil from the sliding parts to the friction section under centrifugal force.

The larger and smaller friction rings may adhere to the opposite flange surfaces of the follower pulley 1.

What is claimed is:

1. A friction type of power transmission mechanism for driving a reel support in a VTR wherein the power is transmitted from a motor to the reel support via a follower pulley, which is sandwiched and clamped between a base disk and an annular plate, characterized in that the follower pulley has a first friction ring sandwiched between the base disk and the lower flange surface of the follower pulley and a second friction ring sandwiched between the annular plate and the upper flange surface of the follower pulley, the diameter of the circular opening of one of said first and second friction rings being equal to or larger than the outer diameter of the other friction ring.

2. A friction type of power transmission mechanism for driving a reel support in a VTR according to claim 1, wherein the follower pulley has inner circular and outer annular sections at different levels, thus defining stepwise transitions from the inner circular to outer annular section on the opposite sides of the follower pulley.

3. A friction type of power transmission mechanism for driving a reel support in a VTR according to claim 2, wherein the base disk has the first friction ring adhering to its upper surface, and the annular plate has the second friction ring adhering to its lower surface.

4. A friction type of power transmission mechanism for driving a reel support in a VTR according to claim 2, wherein the follower pulley has the first and second friction rings adhering to its opposite flange surfaces.

5. A friction type of power transmission mechanism for driving a reel support in a VTR according to claim 1, wherein the base disk has the first friction ring adhering to its upper surface, and the annular plate has the second friction ring adhering to its lower surface.

6. A friction type of power transmission mechanism for driving a reel support in a VTR according to claim 1, wherein the follower pulley has the first and second friction rings adhering to its opposite flange surfaces.

* * * * *